United States Patent [19]

Bourret

[11] Patent Number: 5,085,614
[45] Date of Patent: Feb. 4, 1992

[54] TENDERIZING DEVICE ESPECIALLY FOR BUTCHERY MEAT

[75] Inventor: Jean Alain Bourret, Paris, France

[73] Assignee: Societe de Construction L.B., St. Georges Cedex, France

[21] Appl. No.: 676,334

[22] Filed: Mar. 28, 1991

[30] Foreign Application Priority Data

Mar. 28, 1990 [FR] France .................. 90 03962

[51] Int. Cl.⁵ .............................................. A22C 9/00
[52] U.S. Cl. ................................................... 452/141
[58] Field of Search ........................ 452/141, 144, 147

[56] References Cited

U.S. PATENT DOCUMENTS

| | | | |
|---|---|---|---|
| 2,061,799 | 11/1936 | Hintz | 452/141 |
| 2,100,770 | 11/1937 | Wachowski | 452/146 |
| 2,217,763 | 10/1940 | Moldawsky | 452/141 |
| 2,253,123 | 8/1941 | Hart | 452/141 |
| 3,283,360 | 11/1966 | Tamain | 452/141 |
| 3,727,267 | 4/1973 | Clark | 452/141 |
| 3,900,918 | 8/1975 | Allinquant et al. | 452/141 |
| 4,870,717 | 10/1989 | Hirano | 452/147 |

FOREIGN PATENT DOCUMENTS 1018796 11/1953 France .
1369430 7/1964 France .
1394786 5/1965 France .

*Primary Examiner*—Willis Little
*Attorney, Agent, or Firm*—Sherman and Shalloway

[57] ABSTRACT

This tenderizing device especially for butchery meat, comprising a stand (2) equipped with a base (3) for receiving the meat and with a blade carrier assembly (4) guided in displacement in the stand towards the base under the control of actuating means (5), is characterized in that the said blade carrier assembly (4) takes the form of a U-shaped block, the lower part (9) of which comprises two parallel and spaced supporting branches (10, 11), on which rest projecting parts (12a, 12b) provided in the upper part of the blades (12), and in that there are removable means (13, 14) for blocking the blades, interacting with the upper surface of the blades (12) and the lateral branches of the U-shaped block, in order to block the blades in position.

8 Claims, 2 Drawing Sheets

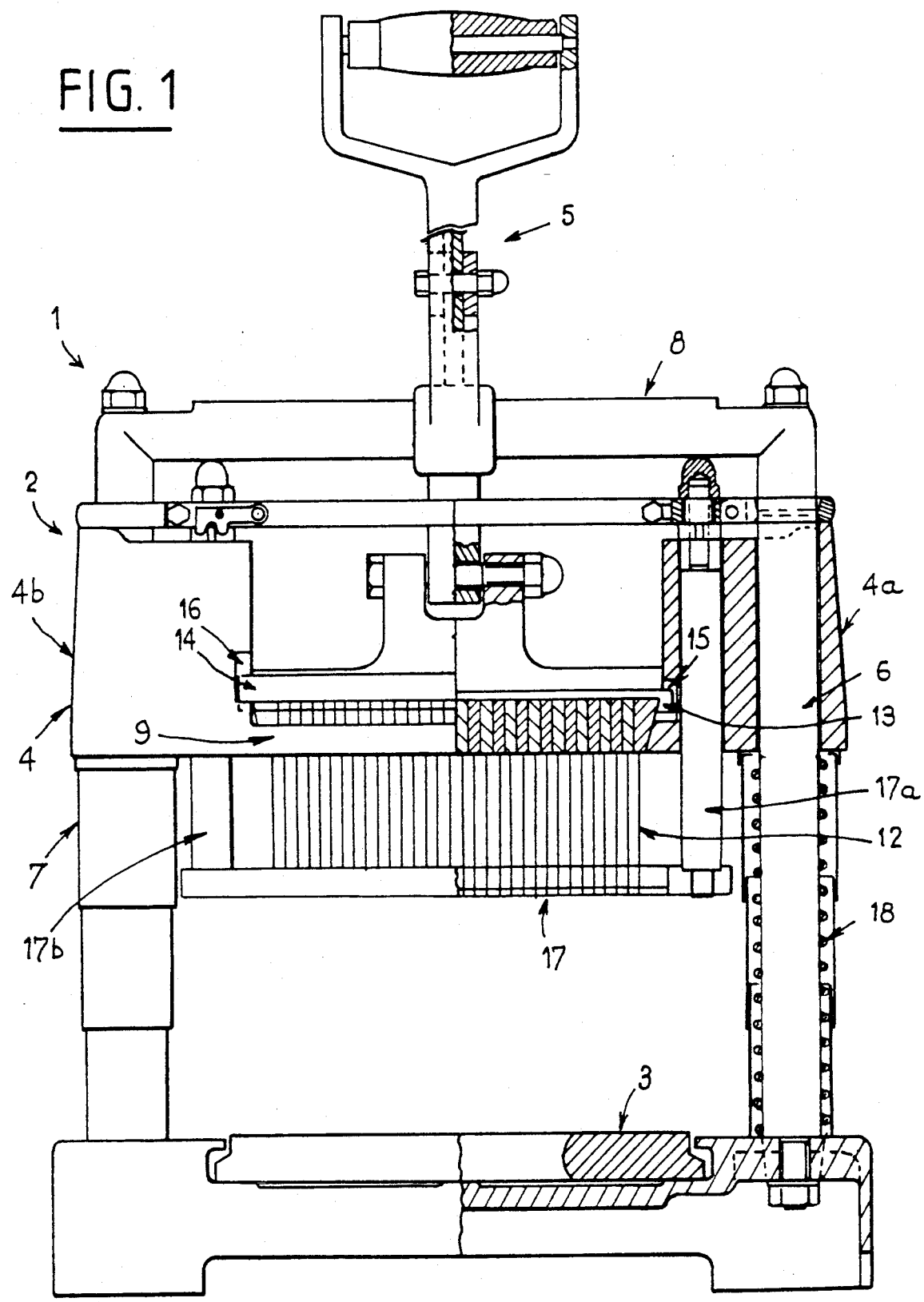

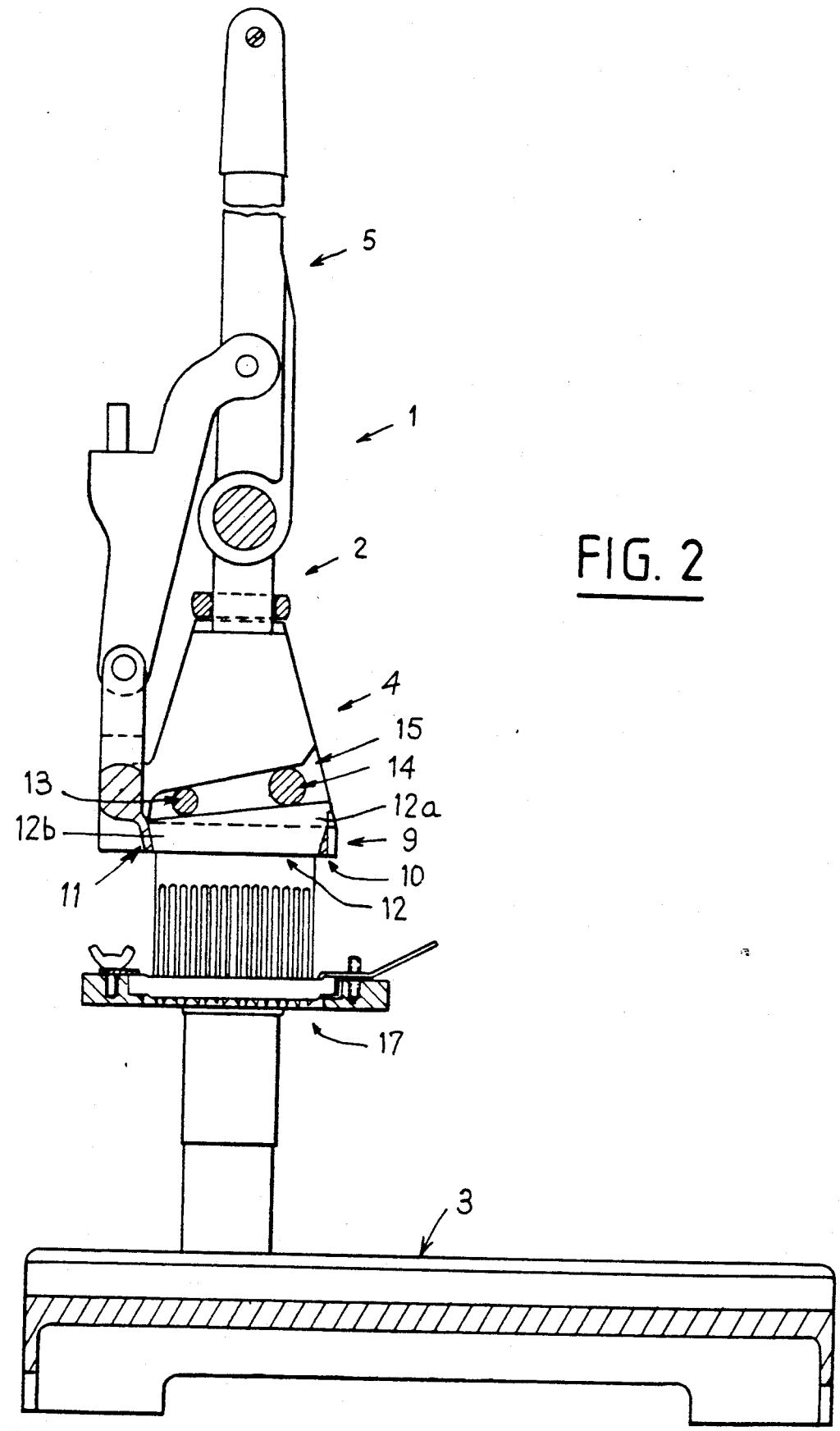

TENDERIZING DEVICE ESPECIALLY FOR BUTCHERY MEAT

The present invention relates to a tenderizing device especially for butchery meat.

Devices of this type generally comprise a stand equipped with a base for receiving the meat and with a blade carrier assembly guided in displacement in the stand towards the base under the control of actuating means, for the purpose of tenderizing the meat.

One of the main characteristics of these devices must be the ease with which particularly the blades of the blade carrier assembly are mounted and dismounted, to make it possible to clean and disinfect them.

Already known in the state of the art, especially from the document FR-A-2,464,029, is a tenderizing device of this type, in which the blade carrier or knife carrier assembly is formed by a knife carrier block consisting of a frame designed for receiving and clamping a set of removable knife blades, and a plate under which the said block is arranged, this plate having slideways which interact with rails fixed to the frame, in order to fasten this frame to the plate.

However, this device has some disadvantages inasmuch as the dismounting of the blades requires a plurality of successive operations.

In fact, during this dismounting, the frame for receiving the set of knife blades has to be separated from the plate, for example by causing it to slide in the slideways, and the frame then released, so that the blades can be removed from it for the purpose of cleaning them.

It will therefore be appreciated that all these operations increase the cleaning time for the device and that the structure of such a device is relatively complex, thus increasing the production cost of the latter.

The object of the invention is, therefore, to solve these problems by proposing a device which is simple and reliable and in which the mounting and dismounting of the blades are very quick and very simple.

To achieve this, the subject of the invention is a tenderizing device especially for butchery meat, comprising a stand equipped with a base for receiving the meat and with a blade carrier assembly guided in displacement in the stand towards the base under the control of actuating means, characterised in that the said blade carrier assembly takes the form of a U-shaped block, the lower part of which comprises two parallel and spaced supporting branches, on which rest projecting parts provided in the upper part of the blades, and in that there are removable means for blocking the blades, interacting with the upper surface of the blades and the lateral branches of the U-shaped block, in order to block the blades in position.

Advantageously, the blocking means comprise at least one blocking rod, the ends of which are designed to engage into grooves made in the lateral branches of the U-shaped block in order to block the blades.

The invention will be understood better from the following description given purely by way of example and made with reference to the accompanying drawings, in which:

FIG. 1 shows a front view of a tenderizing device according to the invention, the right-hand part of this figure being shown in section; and FIG. 2 shows a sectional side view of the device illustrated in FIG. 1.

As can be seen in these figures, a tenderizing device especially for butchery meat, designated by the general reference 1 in these figures, comprises in a way known per se a stand 2 equipped with a base 3 for receiving the meat and with a blade carrier assembly 4 guided in displacement in this stand towards the base under the control of actuating means 5.

These actuating means 5 consist, for example, of an operating lever displaceable by the user and connected to the blade carrier assembly by all suitable means. It goes without saying that these displacement means can also consist, for example, of a jack or the like.

Likewise in a conventional way, as illustrated in more detail in FIG. 1, the stand of the device according to the invention comprises two columns 6 and 7, along which the blade carrier assembly 4 is displaced. The lower ends of these columns 6 and 7 are connected to the meat-receiving base 3, whilst the upper ends of these are connected by means of a cross-member 8.

The blade carrier assembly 4 of the device according to the invention takes the form of a U-shaped block, the lower part 9 of which comprises two parallel and spaced supporting branches 10 and 11 respectively (FIG. 2), on which rest projecting parts 12a, 12b provided in the upper part of the blades, for example 12. The lateral branches of the U-shaped block forming the blade carrier assembly 4 have tubular sleeves 4a and 4b arranged respectively about the columns 6 and 7.

There are also removable means for blocking the blades, interacting with the upper surface of these blades and the lateral branches of the U-shaped block, in order to block the blades in position.

As can be seen more particularly in FIG. 2, these means for blocking the blades can consist of two rods 13 and 14.

The ends of these rods are designed, for example, to engage into respective grooves 15 and 16 made in the lateral branches of the U-shaped block in order to block the blades in position. These grooves are open at one end, to make it possible to introduce and withdraw the rods, and have edges inclined in the direction of the base from their open end, to make it possible to wedge the blades in position.

It should be noted that the upper surface of the blades can likewise be inclined in the direction of the base from the open end of the grooves, and that the blocking rods can consist of cylindrical rods of different diameters, allowing their distribution over the upper surface of the blades in order to ensure a balanced blocking of these.

The projecting parts of the blades can be formed by inclined edges of a bolster moulded onto the blade itself, and this bolster can consist, for example, of plastic or the like.

As can be seen in FIG. 1, the outer faces of the end blades of the set of blades arranged in the blade carrier assembly can likewise be inclined so as to ensure that the blades are wedged in position.

These blades are also mounted so as to be displaceable through a grid 17 fastened to the stand by means of supporting rods 17a and 17b, and the blade carrier assembly can be mounted displaceably in the stand counter to elastic means 18 arranged around the columns 6 and 7 and tending to return it towards the retracted position shown in these figures.

It will therefore be appreciated that the blades of the device according to the invention are extremely easy to mount and dismount, in so far as it is sufficient to withdraw the blocking rods 13 and 14 in order to gain direct access to each blade for the purpose of cleaning and disinfection.

It goes without saying, of course, that the bolsters of the blades can have a form different from that illustrated in these figures, inasmuch as the projecting parts of these can consist of projecting parts which are straight and not inclined like those shown.

What is claimed is:

1. Tenderizing device especially for butchery meat, comprising a stand (2) equipped with a base (3) for receiving the meat, removable blades having upper projecting parts and with a blade carrier assembly (4) guided in displacement in the stand towards the base under the control of actuating means (5), characterised in that the said blade carrier assembly (4) takes the form of a U-shaped block, the lower part (9) of which comprises two parallel and spaced supporting branches (10, 11), on which rest said upper projecting parts (12a, 12b) of the blades (12), and removable means (13, 14) for blocking the blades, interacting with the upper surface of the blades (12) and the lateral branches (4a, 4b) of the U-shaped block, in order to block the blades in position.

2. Device according to claim 1, characterised in that the blocking means comprise at least one blocking rod (13, 14), the ends of which are designed to engage into grooves (15, 16), made in the lateral branches of the U-shaped block in order to block the blades.

3. Device according to claim 2, characterised in that the grooves have an open end for introducing and withdrawing the rod or each rod.

4. Device according to claim 3, characterised in that the rod or each rod is cylindrical.

5. Device according to claim 4, characterised in that the blocking means comprise two blocking rods (13, 14) of different diameters distributed over the upper surface of the blades.

6. Device according to claim 3 characterized in that the upper surface of the blades (12) and the edges of the grooves (15, 16) are inclined in the direction of the base (3) from the open end of the grooves.

7. Device according to claim 1, characterised in that the projecting parts of the blades (12) are formed by edges of a bolster moulded onto the blade.

8. Device according to claim 7, characterised in that the projecting parts of the blades are formed by inclined edges of the bolster.

* * * * *